(12) United States Patent
Sedouram et al.

(10) Patent No.: US 12,517,944 B2
(45) Date of Patent: Jan. 6, 2026

(54) CONTEXTUAL QUERYING OF CONTENT RENDERING ACTIVITY

(71) Applicant: Google LLC, Mountain View, CA (US)

(72) Inventors: Ramprasad Sedouram, Bangalore (IN); Patlavath Bharathi Dharma Teja Naik, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 240 days.

(21) Appl. No.: 18/007,546

(22) PCT Filed: Aug. 22, 2022

(86) PCT No.: PCT/US2022/041004
§ 371 (c)(1),
(2) Date: Dec. 1, 2022

(87) PCT Pub. No.: WO2023/244255
PCT Pub. Date: Dec. 21, 2023

(65) Prior Publication Data
US 2024/0303267 A1 Sep. 12, 2024

(30) Foreign Application Priority Data
Jun. 16, 2022 (IN) .............................. 202221034569

(51) Int. Cl.
*G06F 16/438* (2019.01)
*G06F 3/16* (2006.01)
(Continued)

(52) U.S. Cl.
CPC ............ *G06F 16/438* (2019.01); *G06F 3/165* (2013.01); *G06F 16/433* (2019.01); *G06F 16/434* (2019.01); *G06F 16/532* (2019.01)

(58) Field of Classification Search
CPC ..... G06F 16/434; G06F 16/433; G06F 16/532
(Continued)

(56) References Cited

U.S. PATENT DOCUMENTS

| 2014/0188925 A1* | 7/2014 | Skolicki | H04N 21/4828 707/765 |
| 2015/0088923 A1* | 3/2015 | Garcia-Barrio | G06F 16/243 707/769 |
| 2016/0147496 A1* | 5/2016 | Lee | G06F 3/165 345/1.3 |

OTHER PUBLICATIONS

International Search Report and Written Opinion for Application No. PCT/US2022/041004, mailed Mar. 6, 2023, 13 pages.
(Continued)

*Primary Examiner* — Thu N Nguyen
(74) *Attorney, Agent, or Firm* — DORITY & MANNING P.A.

(57) ABSTRACT

In an example aspect, the present disclosure provides for an example method for processing queries over content rendering activity. The example method includes receiving, by a computing system comprising one or more processors, a first input signal of a first modality, the first input signal being obtained using one or more sensors of a client device and providing local context signals associated with a content rendering event on an output device. The example method includes receiving, by the computing system, a second input signal of a second modality different from the first modality. The example method includes generating, by the computing system and based on the first input signal and the second input signal, a content query. The example method includes retrieving, by the computing system and based on the content query, a content item associated with the content rendering event.

20 Claims, 8 Drawing Sheets

(51) Int. Cl.
    *G06F 16/432*         (2019.01)
    *G06F 16/532*         (2019.01)
(58) Field of Classification Search
    USPC .......................................................... 707/722
    See application file for complete search history.

(56) References Cited

OTHER PUBLICATIONS

International Preliminary Report on Patentability for Application No. PCT/US2022/041004, mailed Dec. 26, 2024, 9 pages.

* cited by examiner

CONTEXTUAL QUERYING OF CONTENT RENDERING ACTIVITY

RELATED APPLICATIONS

This application is based upon and claims the right of priority under 35 U.S.C. § 371 to International Application No. PCT/US2022/04100, filed Aug. 22, 2022. International Application No. PCT/US2022/04100 is hereby incorporated by reference herein in its entirety. International Application No. PCT/US2022/04100 claims the benefit of and priority to Indian Provisional Patent Application No. 202221034569, filed Jun. 16, 2022. Indian Provisional Patent Application No. 202221034569 is hereby incorporated by reference herein in its entirety.

FIELD

The present disclosure relates generally to generating and processing queries. More particularly, example aspects of the present disclosure relate to querying over content rendering activity.

BACKGROUND

Users can interact with content using a variety of endpoint devices. Different endpoint devices can offer different functionality that caters to different kinds of user experiences. In some scenarios, some devices can be used to consume content (e.g., listen to, watch, etc.). Some users may desire to obtain that content, or related services or materials, using a different device.

SUMMARY

Aspects and advantages of embodiments of the present disclosure will be set forth in part in the following description, or can be learned from the description, or can be learned through practice of the embodiments.

In an example aspect, the present disclosure provides for an example method for processing queries over content rendering activity. The example method includes receiving, by a computing system comprising one or more processors, a first input signal of a first modality, the first input signal being obtained using one or more sensors of a client device and providing local context signals associated with a content rendering event on an output device. The example method includes receiving, by the computing system, a second input signal of a second modality different from the first modality. The example method includes generating, by the computing system and based on the first input signal and the second input signal, a content query. The example method includes retrieving, by the computing system and based on the content query, a content item associated with the content rendering event.

In some embodiments of the example method, the first input signal includes an image of the output device.

In some embodiments of the example method, the first input signal includes an audio signal recorded by the client device.

In some embodiments of the example method, the second input signal includes activity data associated with a user account corresponding to the client device.

In some embodiments of the example method, the second input signal includes a schedule of audio or video playback associated with one or more devices associated with a user account corresponding to the client device.

In some embodiments of the example method, the second input signal includes proximity data associated with one or more devices associated with a user account corresponding to the client device.

In some embodiments of the example method, the first input signal includes an image of the output device. In some embodiments of the example method, the second input signal includes an audio signal recorded by the client device.

In some embodiments of the example method, the example method includes generating, by the computing system and using a machine-learned image processor, a visual query based on an image recorded by the client device.

In some embodiments of the example method, the content query is based on cross-referencing the visual query with one or more contextual cues.

In some embodiments of the example method, the contextual cues are audio cues.

In some embodiments of the example method, the visual query corresponds to a source device for the audio cues.

In some embodiments of the example method, the first input signal and the second input signal are cross-referenced to disambiguate commingled audio signals.

In some embodiments of the example method, the client device includes a wearable device.

In some embodiments of the example method, the content item is retrieved for rendering on the client device.

In some embodiments of the example method, the content item is transmitted to the client device for rendering on the client device.

In some embodiments of the example method, the content item is configured for rendering in an augmented reality interface.

In some embodiments of the example method, the content item is configured for rendering in a virtual reality interface.

In some embodiments of the example method, the client device is a first client device, and wherein the content item is transmitted to a second client device for rendering on the second client device.

In some embodiments of the example method, the first client device is associated with a user account, and wherein the second client device is associated with the user account.

In some embodiments of the example method, the local context signals are associated with a physical response of the user to the content rendering event.

In some embodiments of the example method, the local context signals are associated with a glance of the user at the output device.

In some embodiments of the example method, the local context signals are indicative of an identifier of the output device.

In some embodiments of the example method, the content query is authenticated by cross-referencing local context signals indicative of an identifier of the output device with one or more known identifiers associated with a user of the client device.

In some embodiments of the example method, the computing system includes the client device.

In some embodiments of the example method, the method is performed on the client device.

In an example aspect, the present disclosure provides for an example memory device that includes one or more non-transitory computer-readable media storing instructions executable to cause one or more processors to perform operations. In some embodiments of the example memory device, the operations include the example method(s) described herein.

In an example aspect, the present disclosure provides for an example system for processing multimodal queries over content rendering activity. In some embodiments, the example system includes one or more processors and the example memory device.

In some embodiments of the example system, the system includes the client device.

In some embodiments of the example system, the example system includes a server device configured for serving content to one or more devices associated with a user of the client device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
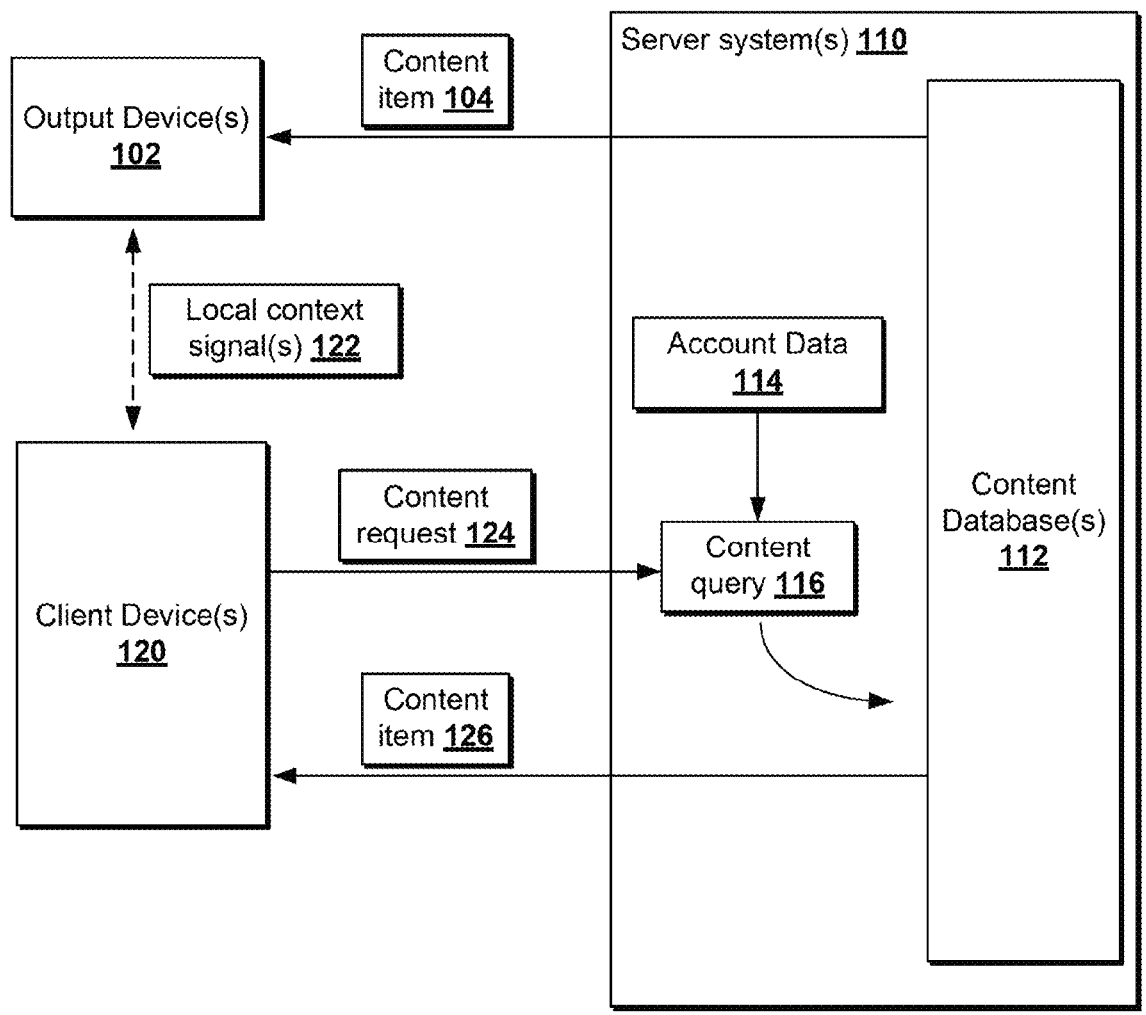
FIG. 1 depicts a block diagram of an example computing system that can generate and process content queries according to example embodiments of the present disclosure.

Reference numerals that are repeated across plural figures are intended to identify the same features in various implementations.

DETAILED DESCRIPTION

Overview

Example embodiments according to aspects of the present disclosure generally relate to generating and processing queries over content rendering activity. In some embodiments, content can be rendered on an endpoint (e.g., audio content, visual content, etc.) in a manner that provides for convenient consumption, but it may be more convenient to interact with or otherwise access the content (or related content) using another device.

Advantageously, example embodiments according to aspects of the present disclosure can provide for improved retrieval or recall of the desired content by querying over content rendering activity of the endpoint. In some embodiments, techniques according to the present disclosure can leverage multiple input modalities to generate content queries for surfacing relevant content on a client device. For instance, audio content can be played on an output node (e.g., an audio driver connected to a smart device). In some situations, a user of a client device may desire additional information related to the audio content. Example embodiments according to the present disclosure can enable the user to use one or more sensors of the client device to obtain contextual information that can be used to query a content playback history associated with the output node.

In some embodiments, the contextual information can include local context, such as contextual cues local to the output node, the client device, or both. For instance, in some embodiments, for example, a user can use a client device to capture an image of the source of the audio content (e.g., the smart device). The image can be processed to understand the intent of the user to retrieve information related to the audio content. For instance, the image can be processed to identify an audio source (e.g., a smart device) in the frame, and the identification of an audio source (or of a particular audio source associated with the user) can be a trigger for querying records associated with a playback history for that user's audio devices. In this manner, for example, multiple modalities of input (e.g., image input, playback history input) can be used to identify and retrieve related content with improved accuracy and security by leveraging local context and account ecosystem data.

Prior techniques generally suffer from increased manual data entry or decreased precision in content retrieval. For example, some prior techniques rely on the user to manually identify keywords, generate a query based on the keywords (e.g., textual query, verbal query, etc.) for entry to a search engine, and browse numerous results in hope of discovering content related to the previously rendered content. Some other techniques may automate the process by, for example, capturing an audio recording of the audio content and processing the audio content to generate a query for searching. But such prior techniques generally are unable to leverage multiple input modalities as presently disclosed.

Leveraging local context and multiple input modalities to construct content queries according to example embodiments of the present disclosure can provide for a number of technical effects and benefits. For instance, cross-referencing a plurality of different input modalities can improve the robustness of resulting content queries to the quality of the inputs by reducing the criticality of faults in one or the other modality. More robust content queries can reduce a number of erroneous or spurious queries submitted with null relevant results, decreasing network communications, client device resource expenditures (in generating the queries), and server device resource expenditures (in processing the queries). More accurate content queries can also provide for decreased resource usage by the client device, as undue browsing of irrelevant content results can generally be reduced or avoided. In this manner, for example, client devices can obtain the results of improved content queries while using less memory, compute time, etc. and at lower latency. Similarly, server devices (e.g., processing the queries) can retrieve the results of improved content queries while using less memory, compute time, etc. and at lower latency.

Furthermore, in some embodiments, leveraging multiple input modalities can provide for an improved user interface that expands the functionality of client devices and computing systems associated therewith. For instance, some environments can be very noisy, with multiple audio sources (e.g., digital, analog, human, machine). In some embodiments, using image data to trigger a visual query that leverages known playback histories for connected devices can cut through the noise and help users isolate the information associated with a particular audio source. In this manner, for example, example embodiments according to the present disclosure can leverage device sensors to expand the capabilities of client devices to assist users in understanding and interacting with audio-based computing systems and devices.

Furthermore, in some embodiments, leveraging multiple input modalities can provide for reducing a number, complexity, or duration for user inputs used for creating content queries. For instance, leveraging multiple input modalities can leverage contextual information in lieu of requiring manual inputs for certain query fields, thereby reducing the time required to construct the query, the computational resources used for constructing the query, etc.

Furthermore, in some embodiments, using local context to supplement or construct content queries can provide for increased security in query processing. For instance, the local contextual cues can operate as a form of two-factor authentication by, in some cases, providing an additional modality for confirming that the requesting device is associated with the output device, providing additional safeguards around the playback history associated with the output device. In this manner, for instance, example embodiments of the present disclosure can provide for more secure content query generation and processing.

With reference now to the Figures, example embodiments of the present disclosure will be discussed in further detail.

Example Devices and Systems

FIG. 1 depicts a block diagram of an example system 100 for generating and processing content queries according to example aspects of the present disclosure. An output device 102 can render a content item 104 delivered by a server system 110 from content database(s) 112. A user may see, hear, or otherwise consume the content item 104 and, at the same time or at a different time, desire to obtain additional information related to the content item 104. At the same or different time, using one or more client device(s) 120, the user can capture local context signal(s) 122 for submitting a content request 124 to the server system(s) 110. The server system(s) 110 can receive the content request 124 and, in conjunction with account data 114 associated with output device 102 (e.g., including a playback history), can form a content query 116 for retrieving content from the content database(s) 112. Based on the content query 116, a content item 126 can be retrieved and delivered to client device(s) 120 (e.g., the same client device that capture the local context signals 122, a different client device, etc.). In this manner, for example, the example system 100 can provide for efficient and secure content query generation and processing.

In some embodiments, the output device(s) 102 can include one or more content rendering interfaces. The content rendering interfaces can be configured for rendering audio content, audiovisual content, visual content, or content in any other sensory perceptible medium. For example, in some embodiments, the output device(s) 102 can include an audio source driving one more audio transducers to emit audible signals. In some embodiments, the output device(s) 102 can include a display device for rendering visual content.

In some embodiments, the output device(s) 102 can include network-connected devices. For instance, the output device(s) 102 can stream content over a network. For example, the output device(s) 102 can stream content item(s) (e.g., content item 104) from a server system 110. In some embodiments, the output device(s) 102 can be associated with a user account. For example, in some embodiments, the output device(s) 102 can execute software that provides customized services based on a user account. For instance, the software can be associated with a content delivery service (e.g., for streaming audio content, audiovisual content, web content, etc.).

In some embodiments, the output device(s) 102 can include "smart" devices, such as a smart speaker, a smart television, a smart appliance. For instance, a smart device can include internet-connected features for providing additional services or contextual outputs in relation to performing another appliance or other task. For instance, a smart television can include functionality for rendering content as well as obtaining the content from the internet.

In some embodiments, the output device(s) 102 can include an assistant device. For example, an assistant device can be configured to determine user intents and provide outputs responsive to the determined user intents. For example, an assistant device can be configured to render audible news content based on determining a user intent to listen to the news (e.g., an intent determined based on a verbal input, textual input, contextual input, or determined based on routine or habits, etc.). In some embodiments, the user intent can be a predicted value indicating a task that is expected to be desired by the user. For instance, the user intent can be a value or set of values (e.g., a vector, an identifier, a function call, etc.) that is obtained (e.g., from an input, from an output by a prediction model, such as a natural language understanding model, an intent prediction model, etc.) that indicates a task or objective associated with one or more inputs received from a user.

In some embodiments, the output device(s) 102 can include a plurality of devices. For instance, in some embodiments, the output device(s) 102 can include multiple devices respectively rendering different content. For instance, a user's household may have multiple output device(s) 102 distributed around the household (e.g., in different rooms, in the same room, etc.). One or more of the devices can be associated with the same user account. In some embodiments, the association is direct: for example, in some embodiments the user account is the primary user account associated with the output device. In some embodiments, the association is indirect: for example, in some embodiments the user account is part of an account group (e.g., a family account group associating members of a family or household, etc.).

In some embodiments, the content item 104 can include various types of content. For instance, the content item 104 can include interactive content or non-interactive content. For example, the content item 104 can include audio content (e.g., recorded, synthesized, mixed, etc.), audiovisual content (e.g., video, slideshow, recorded, synthesized, etc.), and the like. In some embodiments, audio content can include verbal content, such as rendered speech content (e.g., radio, text-to-speech, neural-network generated speech, etc.). For example, in some embodiments, the content item 104 can include one or more of speech, music, news content, shopping content, television content, movie content, social media content, video conference content, teleconference content, etc.

In some embodiments, the content item 104 can include one or more executable components. For instance, an executable component can include executable instructions to retrieve additional content (e.g., supplemental content related to primary content). In some embodiments, an executable component can include a software component, such as an application or a portion thereof. For instance, a content item 104 can include an interactive application experience, such as a game, service provider interface, content browsing interface, etc. for instance, the content item 104 can include a browser component.

In some embodiments, the output device(s) 102 can be configured to render the content item 104 and provide an interaction interface for interacting with the content item 104. In some embodiments, the output device(s) 102 can be configured to render the content item 104 without providing an interaction interface for interacting with the content item 104. In some embodiments, the content item 104 is not configured for receiving interactions.

In some embodiments, the server system(s) 110 can include one or more server devices. For instance, one or more server devices can be interconnected over a local or non-local network connection to collectively form server system(s) 110. For instance, in some embodiments, server system(s) 110 can include first party systems and third party systems. For instance, in some embodiments, the output device(s) 102 and client device(s) 120 can interact with a first party system and a content database 112 can be hosted by a third party system.

For example, in some embodiments, server system(s) 110 can include one or more computing devices for performing operations associated with the output device(s) 102 or the client device(s) 120. For instance, in some embodiments, the server system(s) 110 can provide content items (e.g., content item 104, content item 126) over a network connection. In some embodiments, the server system(s) 110 can facilitate the provision of services using output device(s) 102 or client device(s) 120.

In some embodiments, the server system(s) 110 can perform compute tasks offloaded by any one or more of the output device(s) 102 or the client device(s) 120. For instance, some compute tasks may require more computational resources that provided on any one or more of the output device(s) 102 or the client device(s) 120. For such tasks, in some embodiments the server system(s) 110 can perform the tasks and provide the result(s) to the respective devices.

For instance, in some embodiments, server system(s) 110 can contain one or more machine-learned models for performing various tasks on behalf of any one or more of the output device(s) 102 or the client device(s) 120. For instance, in some embodiments, the server system(s) 110 can include speech recognition models, natural language processing models, image processing models, and the like. For any one or more of the output device(s) 102 or the client device(s) 120, tasks performable by such models can be performed on-device or on the server system(s) 110 (e.g., on a first party system of the server system(s) 110, etc.).

In some embodiments, the server system(s) 110 can contain, control, or otherwise access or direct a content database 112. The content database 112 can include a plurality of content items. The content database 112 can include a plurality of content items from a plurality of sources. For instance, a plurality of sources (e.g., third party sources) can provide content items for storage in or distribution through the content database 112. In some embodiments, the content items in the content database 112 can be associated with an identifier (e.g., for retrieval). In some embodiments, the content items in the content database 112 can be associated with tags, labels, learned embeddings, or other descriptive features for retrieval based on semantic association with other content. For instance, in some embodiments, a query over the content database 112 can be performed to retrieve content items related to one or more semantic concepts. For instance, a semantic concept can be a user interest, such that content items can be retrieved based on an association with a user interest.

In some embodiments, the output device(s) 102 can receive a content item 104 and render the content item 104 for a user. For instance, a user may listen, see, feel, or otherwise interact with the rendered content item. The user may desire to obtain more information about the content item, the subject of the content item, or other related content associated with the content item or the subject thereof. For instance, for a news content item, the user may desire to obtain more news content related to the same story, related stories from the same source, or the same story from different sources, and the like. For instance, for a content item containing speech or visuals related to a product or server, the user may desire to obtain more information related to the product or service, such as other related products or services. In general, it may be desired to recall and interact with content after it was first rendered.

In some embodiments, client device(s) 120 can be used to obtain additional information related to the content item 104. In some embodiments, local context signal(s) 122 can be used to generate a content request 124. For instance, in some embodiments, one or more client device(s) 120 can capture local context signal(s) 122 using one or more sensors on the client device(s) 120.

For example, in some embodiments, local context signal(s) 122 can include location signals (e.g., absolute location, relative location, proximity, etc.). For instance, local context signal(s) 122 can include a proximity to one or more output device(s) 102. In some embodiments, proximity can be determined using a global positioning system, using an IP address, using cellular signal triangulation, and the like. In some embodiments, proximity (e.g., to one or more output device(s)) can be determined using network connection strength, Bluetooth connection strength, near-field communication protocols, ultra-wideband communication protocols, LIDAR, and the like.

In some embodiments, local context signal(s) 122 can include image data. For instance, local context signal(s) 122 can include image data descriptive of the output device(s) 102. For example, a client device can capture an image depicting one or more of the output device(s) 102. For example, a client device can capture an image depicting an identifier of one or more output device(s) 102, such as a bar code, QR code, label, serial number, etc. In some embodiments, the image data can be processed (e.g., by a machine-learned image processing model) to recognize the presence of a depiction of the output device(s) 102 in the image data. For instance, the image data can be processed on device (e.g., on a client device 120) or on a server (e.g., on the server system(s) 110). In some embodiments, the image data can be processed to trigger or generate a content request 124. In some embodiments, the image data can be transmitted along with or as part of the content request 124 for processing on the server system(s) 110.

In some embodiments, local context signal(s) 122 can include audio data. For instance, local context signal(s) 122 can include audio data descriptive of a recording of the rendering of the content item 104. In some embodiments, local context signal(s) 122 can include audio data descriptive of a recording of the rendering of one or more other content items rendered after the content item 104. For instance, a content item 104 may be rendered in its entirety quickly, before a user has an opportunity to cause the client device to begin to record audio data. In such a scenario, the client device can obtain audio data descriptive of a recording of other content items that followed the content item 104.

In some embodiments, local context signal(s) 122 can include other sensor data. For instance, other sensors of a client device 120 can be used to obtain local context. For instance, accelerometers, inclinometers, LIDAR, etc. can be used to detect responses engagement, interest, etc. in association with the rendering of the content item 104. The local context signals 122 can also include client device identifier data, user account identifier data, session identifier data, and the like.

In some embodiments, the local context signal(s) 122 can facilitate disambiguation between one or more output device(s) 102. For instance, an image of one output device can emphasize or prioritize requests for content rendered on that device, even though multiple device may be simultaneously rendering content. Similarly, audio recordings can be used to disentangle competing audio sources by comparing the relative strengths of the signals. In this manner, for example, the local context signal(s) 122 can further disambiguate among multiple output device(s) 102.

In some embodiments, the content request 124 can include the local context signal(s) 122. In some embodiments, the content request 124 can be generated based on the local context signal(s) 122. For instance, the content request 124 can be triggered based on an intent of the user to obtain content associated with the rendering of the content item 104. For instance, a client device can execute a routine, script, application, or other executable component to provide an interface for indicating a determined user intent (e.g., a determined value indicating a task to perform, etc.) to obtain content associated with the rendering of the content item 104. In this manner, for instance, the user can interact with the interface (e.g., by touch, voice command, gesture, latent intent, etc.) to initiate the generation of content request 124.

In some embodiments, initiation of generating content request 124 occurs prior to obtaining the local context signal(s) 122. In some embodiments, initiation of generating content request 124 occurs contemporaneously with or after obtaining the local context signals 122. In some embodiments, a user can interact with an interface configured to initiate the generation of content request 124 (e.g., an application interface designated for doing so). In some embodiments, a general-purpose application (e.g., a general-purpose camera application, audio recording application, etc.) can be used to capture local context signal(s) 122, and processing of the local context signal(s) 122 can trigger generation of the content request 124 based on a determination of a user's intent to request additional content. In some embodiments, such processing of the local context signal(s) 122 can be performed as a background process (e.g., without visible indication thereof). In some embodiments, such processing can be performed as a foreground process (e.g., with visible indication thereof).

In some embodiments, the server system(s) 110 can receive the content request 124 for processing. The server system(s) 110 can use account data 114 for processing the content request 124 to form a content query 116. In some embodiments, the content request 124 can be used to determine one or more attribution metrics associated with consumption of or interaction with the content item 104.

In some embodiments, the account data 114 can include records associated with activity of connected devices associated with an account. For instance, output device(s) 102 and client device(s) 120 can be associated with the same user account, such that the content request 124 from the client device(s) 120 can be processed in view of any records or logs associated with the output device(s) 102.

For example, in some embodiments, the account data 114 can include a playback history or other record of content rendered on one or more associated output device(s). In some embodiments, the playback history can be retained in a limited buffer, such that only the records within a threshold count are retained on a rolling basis. In some embodiments, the playback history can be retained on a temporary basis, such that only the records associated with rendering within a threshold time period are retained on a rolling basis.

In some embodiments, account data 114 can be stored on the server system(s) 110. In some embodiments, account data 114, such as the playback history, can be stored on any one or more of the client device(s) 120 or on any one or more of the output device(s) 102. In some embodiments, the server system(s) 110 can operate to facilitate coordination between the output device(s) 102 and the client device(s) 120. For instance, in some embodiments, the server system(s) 110 can facilitate a secure handshake between the output device(s) 102 and the client device(s) 120 (e.g., using one or more authentication tokens).

In some embodiments, the content query 116 can be executed over the content database 112 to retrieve a content item 126. For instance, the content query 116 can include an identifier of a content item from a playback history associated with an output device indicated in the content request 124. For instance, the content query 116 can include a data structure having one or more fields indicating a content item identifier or other identification features facilitating retrieval of the content item 126 from the content item database 112.

In some embodiments, the content item 126 can include the same or different content from the content item 104. For instance, in some embodiments, the content item 126 can include the same content as the content item 104 configured for rendering on the client device(s) 120 (e.g., instead of the output device(s) 102). In some embodiments, the content item 126 can include different content than the content item 104, such as related additional content, supplemental content, and the like. In some embodiments, the content item 104 includes non-interactive content, and the content item 126 includes interactive content related to the content item 104 (e.g., related to the subject matter thereof).

In some embodiments, the content item 126 can be configured for rendering on the same client device that captured local context signal(s) 122. In some embodiments, a first client device can capture the local context signals 122, and a second client device can receive the content item 126. For example, a first client device can be configured with sensors for capturing local context signal(s) 122. A second client device (e.g., associated with the first client device, such as associated with a shared user account) can be configured for rendering the retrieved content item 126.

Figure 2:
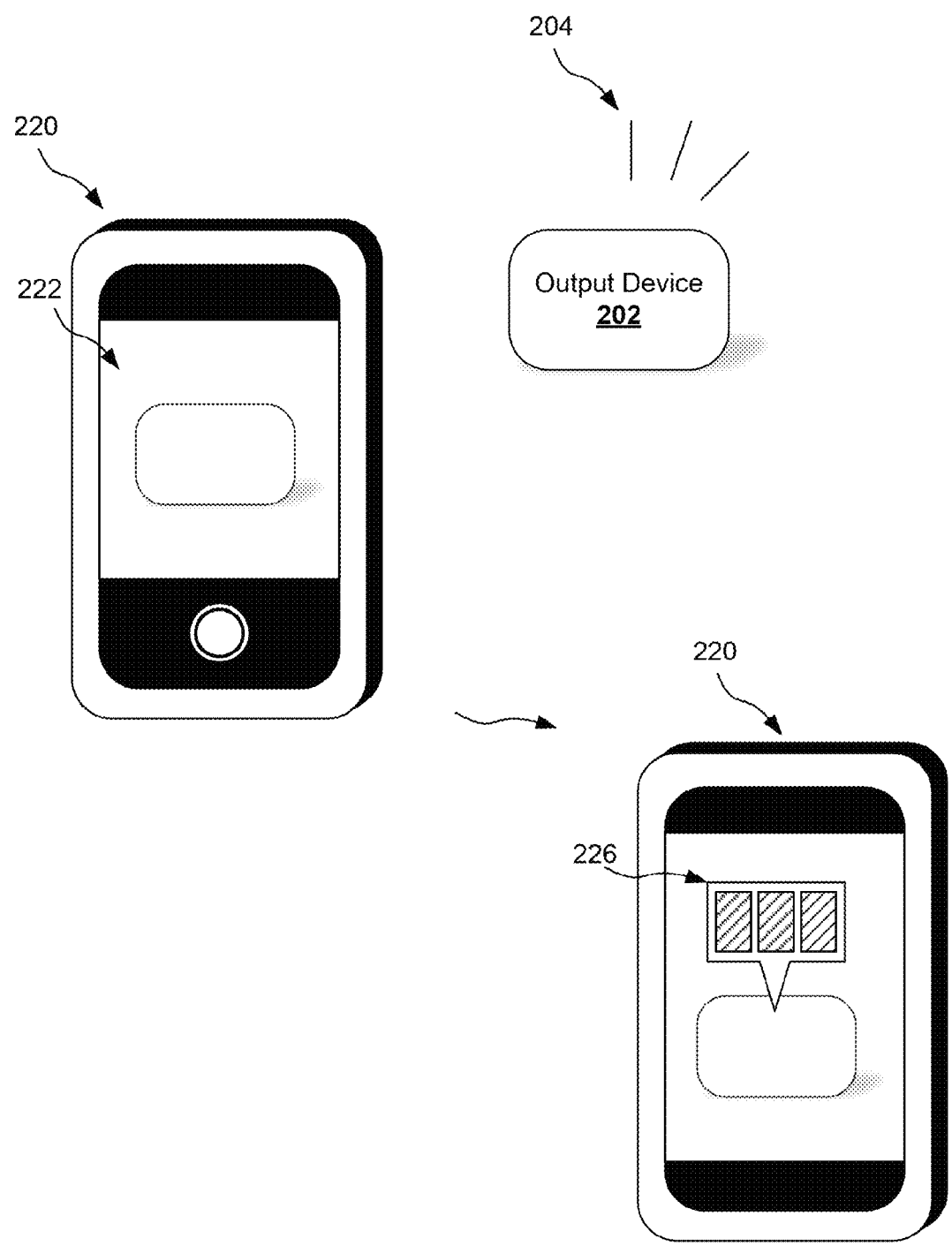
FIG. 2 depicts an illustration of an example implementation for generating content queries according to example embodiments of the present disclosure.
Figure 3:
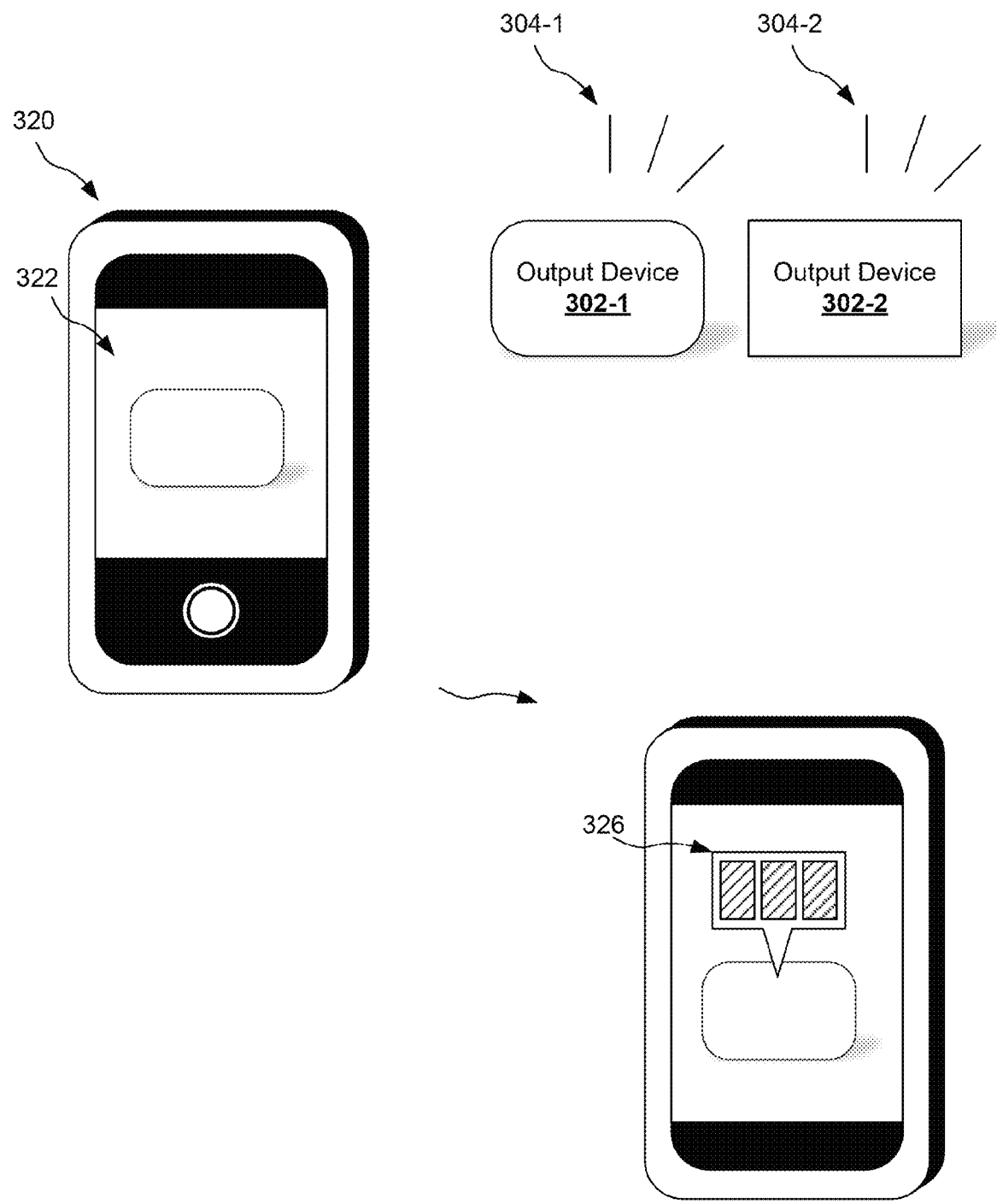
FIG. 3 depicts an illustration of an example implementation for generating content queries according to example embodiments of the present disclosure.
Figure 4:
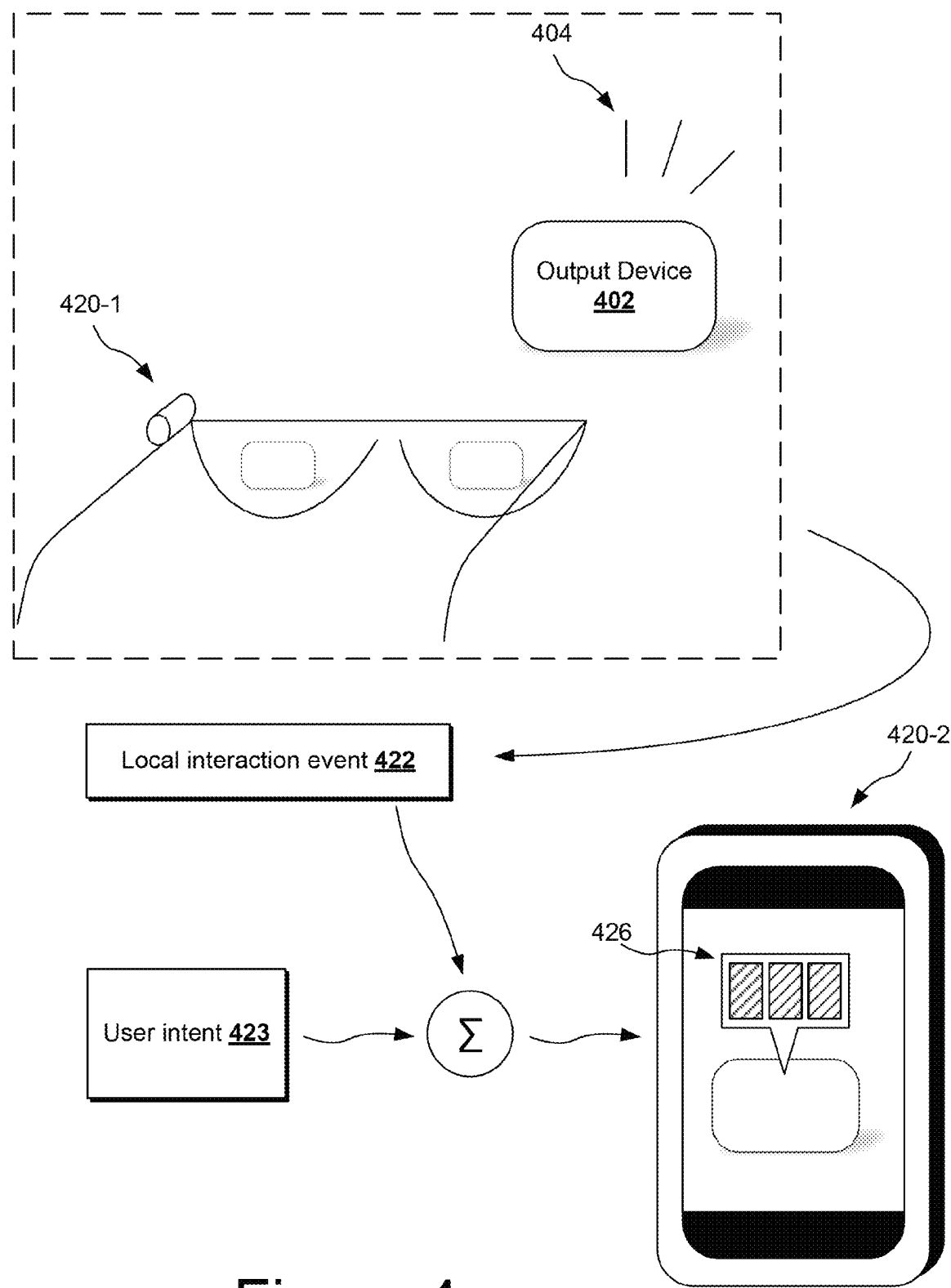
FIG. 4 depicts an illustration of an example implementation for generating content queries according to example embodiments of the present disclosure.

Example embodiments are discussed in further detail with respect to FIGS. 2 to 4. FIG. 2 depicts an illustration of a client device 220 with a camera interface that can capture an image 222 of an output device 202. The output device 202 is illustrated as emitting audio signals 204 for rendering a content item. The image 222 can form a local context signal for generating a content request (e.g., as discussed with respect to FIG. 1). In some embodiments, the retrieved content item 226 can be rendered as an augmented reality overlay in the camera viewport of the client device 220. The retrieved content item 226 can include interactive elements for interacting with the content, thereby facilitating improved access to the content originally rendered via audio signals 204.

FIG. 3 depicts an illustration of a client device 320 with a camera interface that can capture an image 322 of a first output device 302-1. The first output device 302-1 can be emitting first audio 304-1 while a second output device 302-2 can be emitting second audio 304-2. However, by capturing an image of the first output device 302-1 in isolation, the client device 320 can provide local contextual signals to provide for a content query that returns a content item 326 associated with the first output device 302-1.

FIG. 4 depicts an illustration of one example embodiment using multiple client devices. A client device 420-1 (e.g., a wearable device) can capture local context signals associated with an output device 402 that had emitted audio 404. The local context signals can be packaged as a local interaction event 422. For instance, the local interaction event 422 can include an image capture of the output device 402 indicative of a wearer's glance at the output device 402. In some embodiments, a glance can be associated with a user's interest in the rendering of the content item 404. In the same manner, for instance, the local interaction event 422 can include accelerometer data, inclinometer data, etc. that can likewise be associated or correlated with interaction or a physical response to (e.g., indicated by movement measured by the sensors, etc.) the rendering of the content item 404.

In some embodiments, the local interaction event 422 can, in conjunction with a determined user intent 423, be used for providing a content request for retrieving a content item 426 for rendering on a second client device 420-2. For instance, in some embodiments, a user may desire to peruse content related to the content item 404 which had attracted the user's attention earlier (e.g., as recorded or otherwise registered by the first client device 420-1). The first client device 420-1 or the second client device 420-2 can determine the user intent 423 to obtain such content and generate a content request based on the local interaction event to obtain a content item 426 related to the previously consumed content item 404.

Figure 5A:
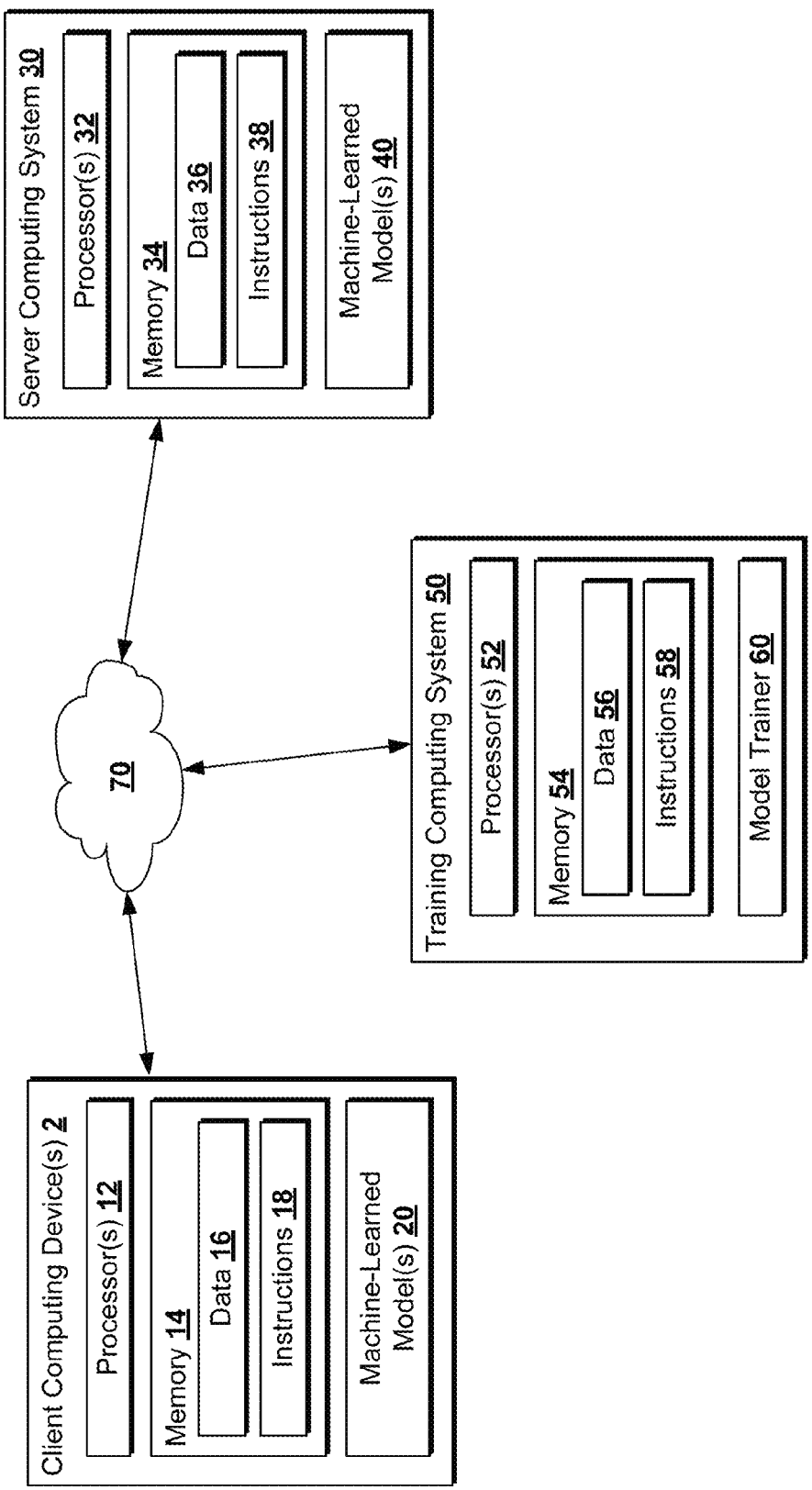
FIG. 5A depicts a block diagram of an example computing system that can generate and process content queries according to example embodiments of the present disclosure.

FIG. 5A depicts a block diagram of an example computing system 1 that can perform according to example embodiments of the present disclosure. The system 1 includes a client computing device 2, a server computing system 30, and a training computing system 50 that are communicatively coupled over a network 70.

The client computing device 2 can be any type of computing device, such as, for example, a mobile computing device (e.g., smartphone or tablet), a personal computing device (e.g., laptop or desktop), a workstation, a cluster, a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to obtain or render content as described herein, etc.).

In some implementations, the user computing device 2 can store or include one or more machine-learned models 20. For example, the machine-learned models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, one or more machine-learned models 20 can be received from the server computing system 30 over network 70, stored in the computing device memory 14, and used or otherwise implemented by the one or more processors 12. In some implementations, the computing device 2 can implement multiple parallel instances of a machine-learned model 20. In some embodiments, machine-learned model(s) 20 can perform personalization of one or more content items, or rendering thereof (e.g., surface selection or other rendering characteristics) for or on the client device 102, 2.

Additionally, or alternatively, one or more machine-learned models 40 can be included in or otherwise stored and implemented by the server computing system 30 that communicates with the computing device 2 according to a client-server relationship. For example, the machine-learned models 40 can be implemented by the server computing system 40 as a portion of a web service. For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 20 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations.

In some implementations, the server computing system 30 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). In some embodiments, machine-learned model(s) 40 can perform personalization of one or more content items, or rendering thereof (e.g., surface selection or other rendering characteristics) for the client device 102, 2.

The computing device 2 or the server computing system 30 can train example embodiments of a machine-learned model (e.g., including models 20 or 40). In some embodiments, the computing device 2 or the server computing system 30 can train example embodiments of a machine-learned model (e.g., including models 20 or 40) via interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations. In some implementations, the training computing system 50 includes or is otherwise implemented by one or more server computing devices.

Parameters of the model(s) can be trained, in some embodiments, using various training or learning techniques, such as, for example, backwards propagation of errors. For example, an objective or loss can be backpropagated through pretraining, general training, or finetuning pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pipeline(s) can perform a number of generalization techniques (e.g., weight decays, dropouts, etc.) to improve the generalization capability of the models being trained.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 5A illustrates one example computing system that can be used to implement the present disclosure. Other computing systems can be used as well. For example, in some implementations, the computing device 2 can include the model trainer 60. In such implementations, a training pipeline can be used locally at the computing device 2. In some of such implementations, the computing device 2 can implement the model trainer 60 to personalize the model(s) based on device-specific data.

Figure 5B:
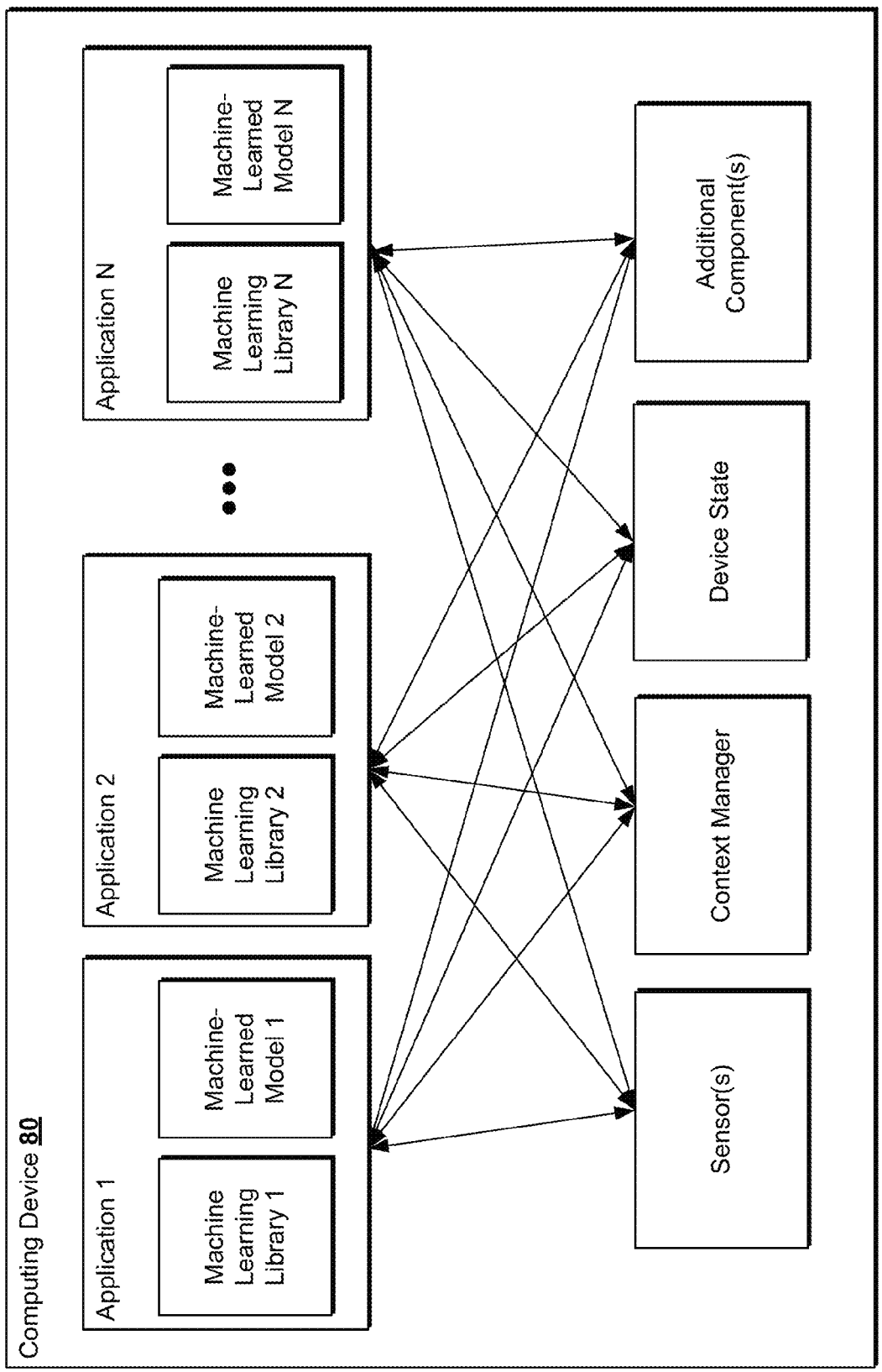
FIG. 5B depicts a block diagram of an example computing device that can generate and process content queries according to example embodiments of the present disclosure.

FIG. 5B depicts a block diagram of an example computing device 80 that performs according to example embodiments of the present disclosure. The computing device 80 can be a user computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 2B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

In some embodiments, each application can respectively generate or record local context signals 122.

Figure 5C:
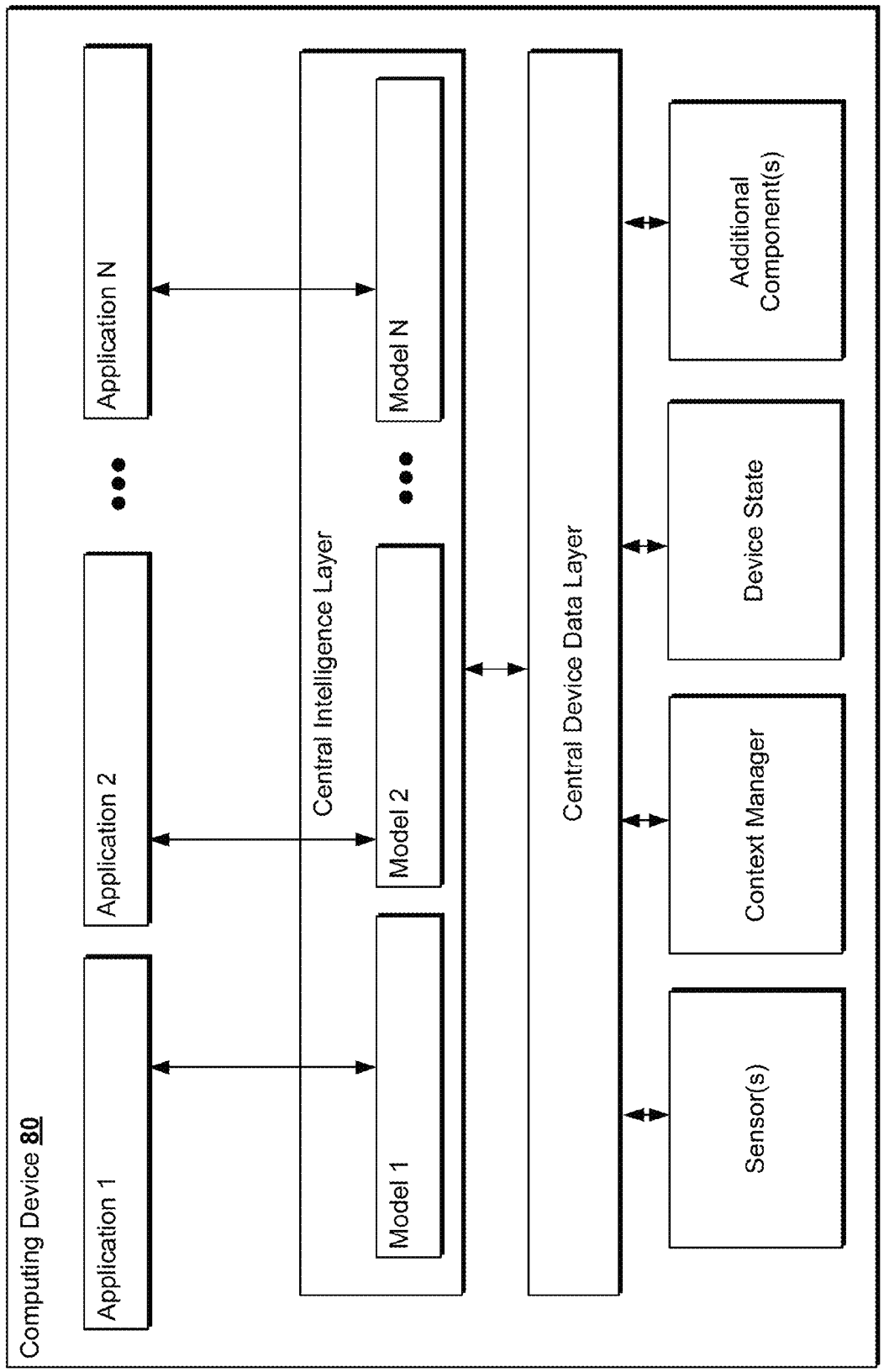
FIG. 5C depicts a block diagram of an example computing device that can generate and process content queries according to example embodiments of the present disclosure.

FIG. 5C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 5C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 5C, the central device data layer can communicate with a number of other components of the computing device, such as, for example, one or more sensors, a context manager, a device state component, or additional components. In some implementations, the central device data layer can communicate with each device component using an API (e.g., a private API).

Example Methods

Figure 6:
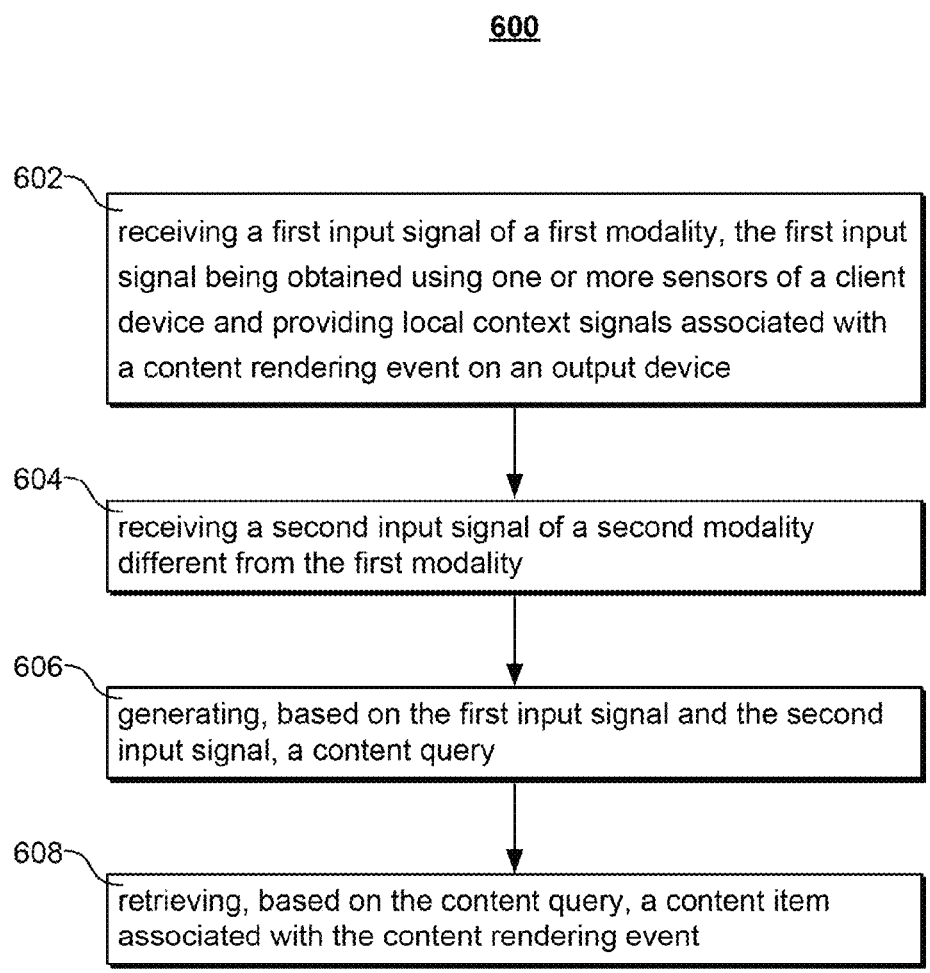
FIG. 6 depicts a flow chart diagram of an example method to generate and process content queries according to example embodiments of the present disclosure.

FIG. 6 depicts a flow chart diagram of an example method 600 to perform according to example embodiments of the present disclosure. Although FIG. 6 depicts steps performed in a particular order for purposes of illustration and discussion, the methods of the present disclosure are not limited to the particularly illustrated order or arrangement. The various steps of the example method 600 can be omitted, rearranged, combined, or adapted in various ways without deviating from the scope of the present disclosure.

At 602, the example method 600 includes receiving a first input signal of a first modality, the first input signal being obtained using one or more sensors of a client device and providing local context signals associated with a content rendering event on an output device. For example, in some embodiments, the first input signal can include image data. For instance, in some embodiments, the first input signal can include an image of the output device. In some embodiments, the first input signal can include an audio signal recorded by the client device. In some embodiments, the first input signal can include motion or vibration data recorded by the client device.

At 604, the example method 600 includes receiving a second input signal of a second modality different from the first modality. For instance, a modality can be based on a data type or data source associated with the signal. For instance, a first input modality can include audio inputs. Another input modality can include textual inputs. Another input modality can include image or video inputs. Another input modality can include motion inputs. Another input modality can include gesture inputs. It is to be understood that various other modalities can be used.

In some embodiments, the second input signal can include activity data associated with a user account corresponding to the client device. For instance, in some embodiments, the second input signal can include a schedule of audio or video playback associated with one or more devices associated with a user account corresponding to the client device (e.g., or one or more entries of such a schedule). In some embodiments, the second input signal can include proximity data associated with one or more devices associated with a user account corresponding to the client device. In some embodiments, the second input signal can include image or audio data.

At 606, the example method 600 includes generating, based on the first input signal and the second input signal, a content query. In some embodiments, the content query can be configured to retrieve one or more content items. For instance, in some embodiments, the content query can be configured to contain an identifier of a content item for retrieval (e.g., a content item identified from a playback history). In some embodiments, the content query can be configured to contain an embedding (e.g., in a semantic feature space) to retrieve one or more content items based on a relevancy or similarity to the embedded values. For instance, a content item database can contain multiple content items associated with embeddings in a latent space. Based on a comparison of the content query embedding and the embeddings of the database items, one or more content items from the database can be retrieved.

In some embodiments, the content query is generated using machine-learned image processing techniques. For instance, in some embodiments, the example method 600 can include generating, using a machine-learned image processor, a visual query based on an image recorded by the client device. In some embodiments, the content query is based on cross-referencing the visual query with one or more contextual cues. In some embodiments, the contextual cues are audio cues. In some embodiments, the visual query corresponds to a source device for the audio cues.

In some embodiments, the first input signal and the second input signal are cross-referenced to disambiguate commingled audio signals. For instance, multiple output devices can be outputting audio/visual content, and a user may desire to submit a content query based on only one of the output devices. In this manner, for example, disambiguation of the input(s) can provide for a content query that retrieves content associated with the output of the desired output device.

At 608, the example method 600 includes retrieving, based on the content query, a content item associated with the content rendering event. In some embodiments, the content item is retrieved for rendering on the client device. In some embodiments, the content item is transmitted to the client device for rendering on the client device. In some embodiments, the content item is configured for rendering in an augmented reality interface. In some embodiments, the content item is configured for rendering in a virtual reality interface.

In some embodiments, the client device is a first client device, and wherein the content item is transmitted to a second client device for rendering on the second client device. For instance, in some embodiments, the first client device is associated with a user account, and wherein the second client device is associated with the user account.

In some embodiments, the first client device or the second client device can include a wearable device. In some embodiments, the local context signals are associated with a physical response of the user to the content rendering event. In some embodiments, the local context signals are associated with a glance of the user at the output device.

In some embodiments, the local context signals are indicative of an identifier of the output device. In some embodiments, the content query is authenticated by cross-referencing local context signals indicative of an identifier of the output device with one or more known identifiers associated with a user of the client device.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Also, terms such as "based on" should be understood as "based at least in part on."

What is claimed is:

1. A method for processing queries over content rendering activity, comprising:
    receiving, by a computing system comprising one or more processors, a first input signal of a first modality, the first input signal being obtained using one or more sensors of a client device and providing local context signals associated with a content rendering event on an output device, wherein the first input signal comprises an image of the output device;
    receiving, by the computing system, a second input signal of a second modality different from the first modality;
    processing, by the computing system and using a machine-learned image processing model, the image to recognize the presence of a depiction of the output device in the image;
    generating, by the computing system and based on the first input signal and the second input signal, a content query based on one or more records associated with the identified output device; and
    retrieving, by the computing system and based on the content query, a content item associated with the content rendering event;
    wherein:
        the content item is retrieved for rendering on the client device; or
        the content item is retrieved for rendering on a second client device different from the client device, the second client device associated with the client device.

2. The method of claim 1, wherein the first input signal comprises an audio signal recorded by the client device.

3. The method of claim 1, wherein the second input signal comprises a schedule of audio or video playback associated with one or more devices associated with a user account corresponding to the client device.

4. The method of claim 1, wherein the second input signal comprises proximity data associated with one or more devices associated with a user account corresponding to the client device, the proximity data indicative of a proximity of the client device to the output device.

5. The method of claim 1, wherein:
    the first input signal comprises an image of the output device; and
    the second input signal comprises an audio signal recorded by the client device.

6. The method of claim 1, comprising:
    generating, by the computing system and using a machine-learned image processor, a visual query based on an image recorded by the client device.

7. The method of claim 6, wherein the content query is based on cross-referencing the visual query with one or more contextual cues.

8. The method of claim 7, wherein the contextual cues are audio cues.

9. The method of claim 8, wherein the visual query corresponds to a source device for the audio cues.

10. The method of claim 1, wherein the first input signal and the second input signal are cross-referenced to disambiguate commingled audio signals.

11. The method of claim 1, wherein the client device comprises a wearable device.

12. The method of claim 1, wherein the content item is retrieved for rendering on the client device.

13. The method of claim 1, wherein the client device is a first client device, and wherein the content item is transmitted to a second client device for rendering on the second client device.

14. The method of claim 13, wherein the first client device is associated with a user account, and wherein the second client device is associated with the user account.

15. The method of claim 1, wherein the local context signals are associated with a physical response of a user to the content rendering event.

16. The method of claim 1, wherein the local context signals are indicative of an identifier of the output device.

17. The method of claim 1, wherein the content query is authenticated by cross-referencing local context signals indicative of an identifier of the output device with one or more known identifiers associated with a user of the client device.

18. The method of claim 1, comprising:
authenticating, by the computing system, the content query by cross-referencing local context signals indicative of an identifier of the output device with one or more known identifiers associated with a user of the client device.

19. A computing system for processing queries over content rendering activity, comprising:
one or more processors; and
one or more transitory or non-transitory computer-readable media storing instructions executable by the one or more processors to cause the computing system to perform operations, the operations comprising:
receiving a first input signal of a first modality, the first input signal being obtained using one or more sensors of a client device and providing local context signals associated with a content rendering event on an output device, wherein the first input signal comprises an image of the output device;
receiving a second input signal of a second modality different from the first modality;
processing, using a machine-learned image processing model, the image to recognize the presence of a depiction of the output device in the image;
generating, based on the first input signal and the second input signal, a content query based on one or more records associated with the identified output device; and
retrieving, based on the content query, a content item associated with the content rendering event;
wherein:
the content item is retrieved for rendering on the client device; or
the content item is retrieved for rendering on a second client device different from the client device, the second client device associated with the client device.

20. One or more transitory or non-transitory computer-readable media storing instructions executable by one or more processors to cause a computing system perform operations, the operations comprising:
receiving a first input signal of a first modality, the first input signal being obtained using one or more sensors of a client device and providing local context signals associated with a content rendering event on an output device, wherein the first input signal comprises an image of the output device;
receiving a second input signal of a second modality different from the first modality;
processing, using a machine-learned image processing model, the image to recognize the presence of a depiction of the output device in the image;
generating, based on the first input signal and the second input signal, a content query based on one or more records associated with the identified output device; and
retrieving, based on the content query, a content item associated with the content rendering event;
wherein:
the content item is retrieved for rendering on the client device; or
the content item is retrieved for rendering on a second client device different from the client device, the second client device associated with the client device.

* * * * *